PROCESS CONTROL OF INDIUM SHEET FILM MEMORIES

Filed Sept. 15, 1964

INVENTORS
REX H. BLUMBERG
HOLLIS L. CASWELL
CHARLES CHIOU
BY
ATTORNEY

Sept. 3, 1968 R. H. BLUMBERG ET AL 3,400,014

PROCESS CONTROL OF INDIUM SHEET FILM MEMORIES

Filed Sept. 15, 1964 2 Sheets-Sheet 2

United States Patent Office 3,400,014
Patented Sept. 3, 1968

3,400,014

PROCESS CONTROL OF INDIUM SHEET FILM MEMORIES

Rex H. Blumberg, Hyde Park, Hollis L. Caswell, Mount Kisco, and Charles Chiou, Yorktown Heights, N.Y., assignors to International Business Machines Corporation, New York, N.Y., a corporation of New York Filed Sept. 15, 1964, Ser. No. 396,604
3 Claims. (Cl. 117—217)

ABSTRACT OF THE DISCLOSURE

A method of manufacturing a superconductive sheet memory is provided to obtain flux-trapping cells that operate uniformly when used in a large memory array. An insulated substrate is placed in an evacuated chamber whose pressure is less than $5\times10^{-6}$ torr and whose partial pressure of oxygen is less than $5\times10^{-8}$ torr; and deposition of indium takes place onto the substrate at a constant rate of between 40–80 A./sec., the deposition being monitored by measuring the sheet conductance of the deposited layer. Deposition is interrupted when the value of sheet conductance is 0.5 to 1.0 mho/sq.

This invention relates to continuous sheet superconductive memories for computer application.

Persistent current superconducting memories have been reported in the literature as evidenced by articles appearing by J. W. Crowe in the IBM Journal of Research and Development, vol. 1, No. 4, October 1957, pp. 294+ and by R. L. Garwin on p. 304+ of the same publication, as well as p. 193, vol. 10 of the 1959 issue of the British Journal of Applied Physics, the contributor being E. H. Rhoderick. In general, a persistent current memory cell would comprise a thin film of material, generally tin, with superconducting voids in such material for trapping flux. Associated with each void in the metal film which is kept at temperatures near absolute zero that maintain the metal superconductive are two drive lines and a sense line located on opposite sides of the thin film. As the current in the drive pulse of each drive line increases, the induced current in the superconducting film exceeds the film's superconducting current carrying capacity, causing the central portion of the cell to become normal, permitting flux lines to link the sense line so that the latter can sense an output signal. As the drive current decays towards zero, a persistent current is set up that circulates about the hole, such circulating current being maintained by flux trapped in the vicinity of the hole.

In order to obtain reliability sufficient so that the individual memory cells can be used in large arrays, it is very important to be able to control the characteristics of each memory cell so that uniformity of operation is obtained throughout the array. Practioners in the art have generally used tin sheets in the superconductive memory arrays but extreme anisotropy and poor stress characteristics have made it difficult to obtain reproducibility in the manufacture of these thin film cryogenic sheet memories. Indium, which is nearly isotropic and has much superior stress properties over tin, has been considered as a superior metal for use in obtaining improved sheet film memories. However, the mere substitution of indium for tin has not proved such superiority unless the process for depositing such indium sheet films was controlled within very specific ranges. After many years of research in the deposition of cryogenic memory sheets involving innumerable depositions and tests, the present process to be described hereinafter was discovered to produce an optimum sheet film. Such optimization required a specific choice of substrate material on which the indium thin sheet was to be deposited, control of the temperature of such substrate, as well as rate of deposition of the indium, the choice of the electrical conductance of the deposited indium, as well as the control of the pressure of the chamber in which the indium was deposited.

Consequently, it is an object of this invention to provide a process for controlling the deposition of indium to form a thin film cryogenic memory.

It is yet another object to provide a proces for obtaining sheet memories that are consistently uniform in their operating characteristics.

The foregoing and other objects, features and advantages of the invention will be apparent from the following more particular description of a preferred embodiment of the invention as illustrated in the accompanying drawings.

Figure 1:
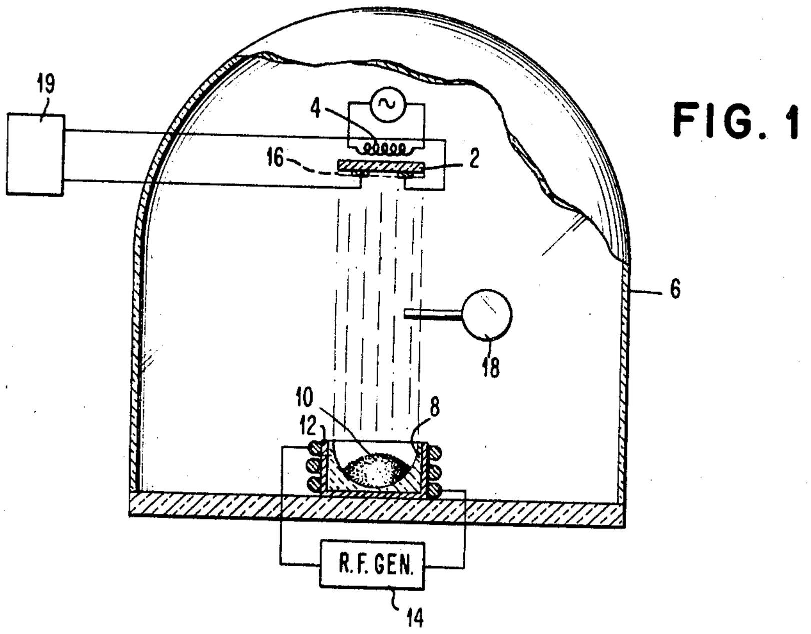
FIGURE 1 depicts an evacuated chamber in which the method for forming the present flux trapping plane can be carried out.

As shown in FIG. 1, a substrate 2 consists of glass or a plastic filled with alumina or silica. The plastic has a high coefficient of expansion and the filling a low coefficient of expansion, but the average coefficient of expansion of the composite plastic is similar to that of a metal. Such a material is sold under the trade name of Durez. Such substrate is maintained by heating unit 4 at a consistent temperature of 20° C. Located within the chamber 6 is a crucible 8 which houses the indium 10, the latter being chosen to be as chemically pure indium as is presently available. Surrounding the crucible 8 is a suitable support 12 for the crucible. An induction heating unit 14 supplies the heat to the crucible for evaporating the indium 10. It is understood that any substitutable heating unit can be used to replace the induction heater, the latter being employed merely to indicate a means for heating the indium. Before deposition takes place onto the substrate 2, the chamber 6 is evacuated to a pressure of less than $5\times10^{-6}$ torr, and the partial pressure of the oxygen within the chamber is maintained under $5\times10^{-8}$ torr. A mask 16 is supported by the substrate 2 should it be necessary to construct the sheet film by employing a pre-arranged configuration of apertures in such plane. Gauge 18 is an ionization gauge type rate monitor or other suitable rate monitor which senses the rate at which the indium is to be deposited upon the substrate 2. For purposes of carrying out the invention, the rate of deposition should be 40–80 A./sec.

Certain basic definitions are now given as an aid in understanding the method relied upon in achieving an improved cryogenic sheet memory. The resistivity $\rho$ of a substance is a measure of the number of free electrons in that substance and is independent of the dimensions of that substance. Its units are ohms-cm. The resistance R of a substance to the flow of such free electrons through it is given by the expression $$R=\frac{\rho\times L}{W\times T}$$

where L is the length, W is the width and T is the thickness of the substance. The units of R are ohms. If one takes a square unit of a substance, it will have a unit of resistance $r$, and such unit is often referred to as sheet resistance. The units of this standard unit of sheet resistance is in ohms/square. If one wishes to obtain R, knowing $r$, then $$R=\left(\frac{\text{ohms}}{\text{sq.}}\right)\times\frac{L}{W}$$

where L is the actual length and W the actual width of the sheet. Sheet resistance $$r=\frac{\rho}{T}$$

where T is the thickness of a square unit of material.

In a similar fashion, $\sigma$ is the conductivity of a substance and is the ability of that substance to conduct or carry an electric current and is independent of the dimensions of that substance. It is the reciprocal of $\rho$ and is expressed in mhos/cm. The conductance C of a substance is the reciprocal of resistance and is expressed in mhos. If one takes a square unit of a substance, it will have a unit of conductance $m$ expressed in mhos/square, and such unit is often referred to as sheet conductance. If one wishes to obtain the actual conductance C, knowing $m$, then $$C=m\left(\frac{\text{mhos}}{\text{square}}\right)\times\frac{W}{L}$$

where W and L are respectively the width and length of such sheet. Sheet conductance $C=\sigma T$ where T is the thickness of a square unit of material.

There are a number of ways for monitoring the rate of deposition of the indium, but two techniques have been known to operate sufficiently accurately to carry out the method described herein. One evaporation rate monitor is described on pp. 773–775 in the "Review of Scientific Instruments," July 1960, vol. 31, No. 7, entitled "Evaporation Rate Monitor" by G. F. Giedd and M. H. Perkins. Another evaporation rate monitor that can be employed for carrying out a feature of the present invention is a quartz crystal rate monitor. A description of such a device appears on p. 1053 of the 1959 issue of the "Review of Scientific Instruments," vol. 30, the authors being P. Oberg and J. Lingensjo. An additional teaching of a suitable quartz crystal rate monitor is found in the article, "Vacuum Symposia," by K. H. Behrndt et al., vol. 7, p. 87, Pergamon Press, New York, 1960 (see R. Miessner—Editor). Whereas an ionization gauge measures the amount of deposited material by producing a current output as a function of the metal vapor in the deposition chamber, in a quartz crystal rate monitor the film material deposited onto the substrate is also deposited onto the face of a quartz crystal which serves as the tank circuit of an RF oscillator. The added mass of the film being deposited onto the quartz crystal shifts the resonant frequency of the oscillator by an amount $\Delta f$, which is related to the film thickness T by the equation $$T=\frac{B\times\Delta f}{d}$$

where $d$ is the density of the film material and B is a constant. This rate monitor is very sensitive provided the film thickness deposited is no greater than 1% of the thickness of the quartz plate.

Figure 2:
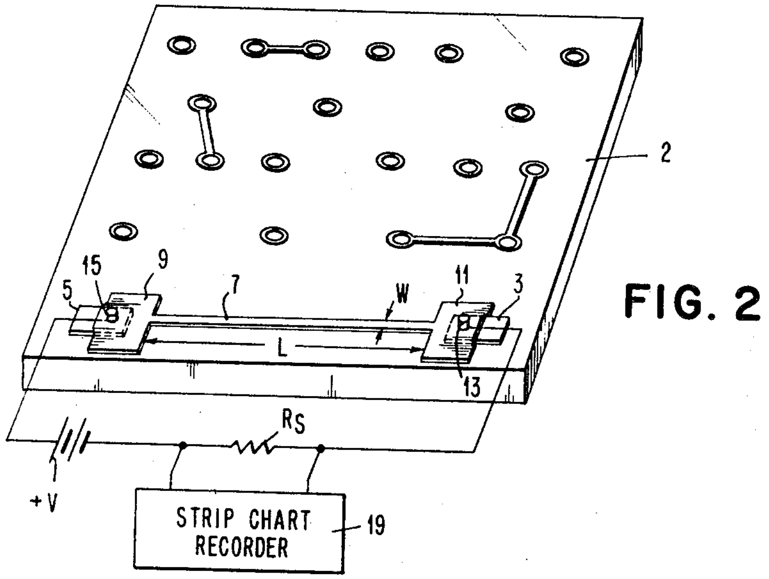
FIGURE 2 shows an electrical circuit for monitoring the electrical conductance of a thin film memory plane during deposition.

Not only is the rate of deposition controlled to provide 40–80 A. of indium per second, but the conductance of the indium sheet being deposited must also be monitored. The monitoring should be accurate enough so that the evaporation of the indium is stopped at a value where the sheet conductance $m$ of the indium film lies between 0.5 to 1 mho/square. FIGURE 2 is a schematic showing of a monitoring device for measuring the conductance of a deposited film during the deposition of such film.

Widened sections 3 and 5 serve as lands which have been previously deposited through a mask onto the glass substrate 2, which substarte is to support the electrical circuitry that will be deposited onto it through a mask, not shown. When deposition begins, the narrow portion 7 is deposited through a mask, not shown, and the electrical sheet conductance of such narrow portion is measured during the deposition of the main superconductive electrical circuitry. Such narrow portion 7 has a width W and a length L. In general, the resistance R of a substance is measured in ohms and is related by the equation $$R=\frac{\rho\times L}{W\times T}$$

where $\rho$ is the resistivity measured in ohms-cm. and T is the thickness of the deposited film measured in centimeters. Since $$\frac{1}{\rho}=\sigma$$

then $$\frac{1}{R}=\frac{\sigma\times W\times T}{L}$$

where $\sigma$ is the conductivity whose units are mhos/cm. Since $V=RI$, then the previous expression can be written as $$\frac{\sigma\times W\times T}{L}\times V=I$$

Prior to the evaporation process wherein film 7 is deposited, lands 3 and 5 were deposited, such lands coming in contact with widened portions 9 and 11 of film strip 7. Pins 13 and 15 are inserted into the substrate 2 through the respective lands 3 and 5 and connected to said pins 13 and 15 is a series circuit comprising voltage source V and resistor $R_S$. A conventional strip chart recorder 19 monitors the voltage drop across $R_S$.

In general, the voltage $V=(R_F+R_S)I$, where I is the current through film 7 whose resistance is $R_F$ and through another resistor $R_S$ of FIGURE 2. Since $R_F \gg R_S$, $V=R_FI$ or $$I=\frac{V}{L}\times\sigma\times W\times T$$

At the beginning of the deposition, there is no current through thin film 7 in that $R_F$ is infinite and no voltage drop appears across $R_S$. When film 7 begins to coalesce as a continuous film instead of being composed of discrete islands of indium, current starts to flow through strip 7 and its resistance $R_F$ decreases as the film becomes thicker. The voltage measured on the strip chart recorder 19 is the product of $R_S\times I$, which leads directly to I since $R_S$ is known. I is related to the film conductivity $\sigma$ by $$I=\frac{\sigma\times W\times T}{L}\times V$$

Other techniques for measuring film conductance during vapor deposition can be employed and such alternative ways are suggested on pp. 3012–3021 of the October 1963 issue of the "Journal of Applied Physics," vol. 34, No. 10 in an article entitled "Behavior of Film Conductance During Vacuum Deposition," by A. J. Learn and R. S. Spriggs. Such other methods of measuring conductance during deposition may employ devices to minimize current flow through film 7 during monitoring so as to avoid possible large surges of current through the film 7, but such other methods are incidental to and not necessary for carrying out the present invention.

Figure 3:
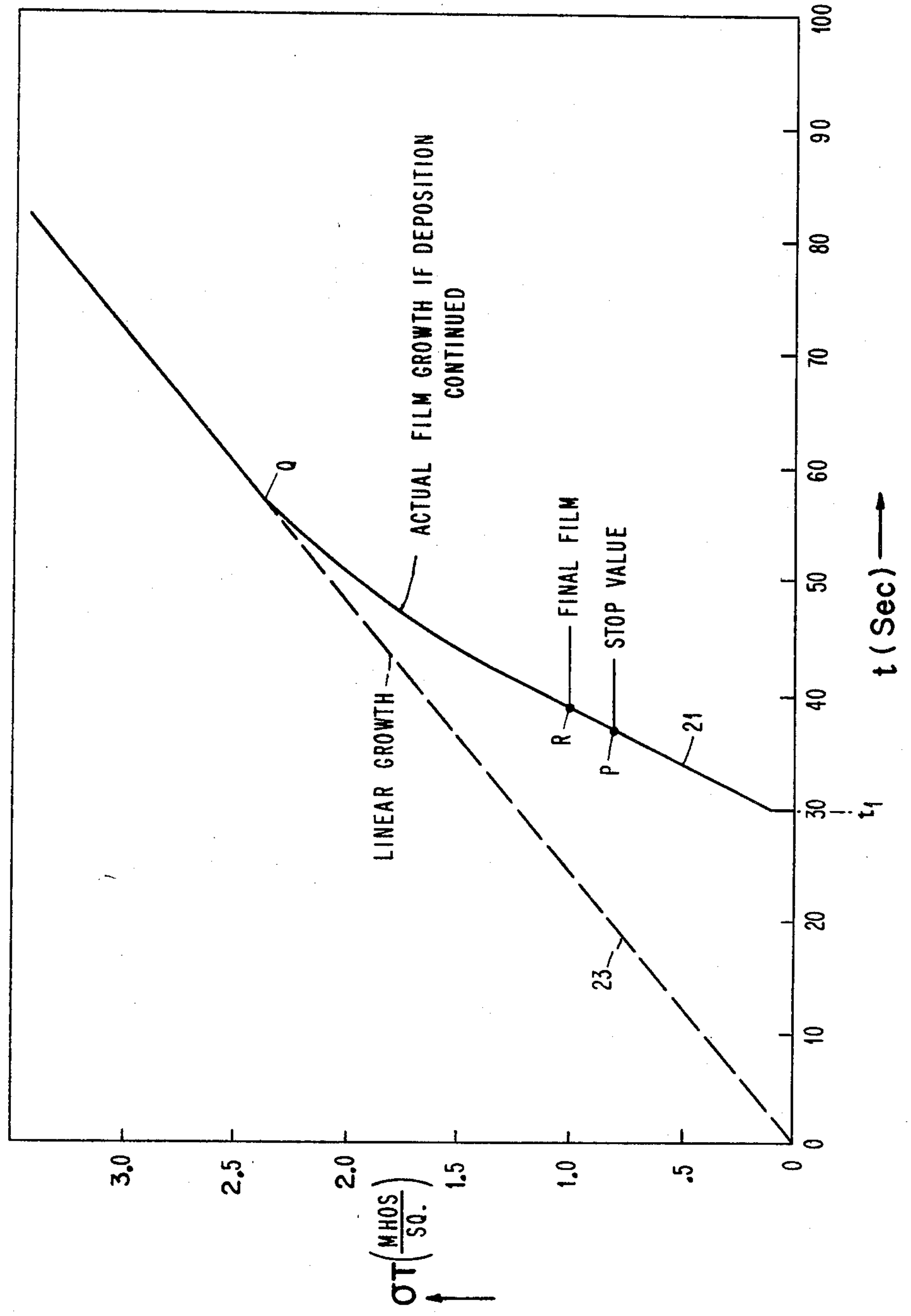
FIGURE 3 is a plot of the sheet conductance, and indirectly the thickness, of deposited film as a function of time.

FIGURE 3 shows a relationship of sheet conductance M or $\sigma T$ and deposition time. The ordinate scale is defined as $$\sigma T=\frac{I\times L}{V\times W}$$

and can be directly scaled on the strip chart recorder, since L, W, and V are defined by the experimental configuration and I is measured by the recorder. The rate of deposition, during the time the strip recorder is active, is held at a constant value by a rate monitor 18, say 40 A./sec. Curve 23 is a sheet conductance versus time plot for a uniformly growing film as by a calculated by a constant deposition rate x time. Curve 21 shows the actual result of a deposition. The indium film does not grow uniformly, but initially consists of a number of little islands which do not contact one another. At time $t_1$ in FIG. 3, an adequate amount of material has been deposited so that current begins to flow through strip 7. It has been found that best results are obtained if the vapor deposition is stopped when the sheet conductance is at a point such as P on curve 21 wherein sT is less than a uniform film having the bulk conductance of indium, such bulk conductance beginning at point Q wherein *dsT/dt* becomes constant. The recommended value of the conductance for indium to obtain good flux-trapping planes is 0.5 to 1 mho/square. So that the value of sT lies somewhere between points P and R.

After deposition of indium has taken place, the indium 10 and its supporting crucible 8 are removed from the evaporation chamber and replaced with a polymer. A recommended polymer is manufactured by Shell Oil Company and is identified as Epon No. 828. Evaporation of the polymer is accompanied by electron bombardment so that the polymer is polymerized by the electron beam during deposition of the polymer.

The above described method for obtaining cryogenic memory sheets has been successful in reproducing sheets whose operating cells are not as sensitive to disturb pulses as prior memory cells in an array were, but also has been successful in increasing the tolerances of driving currents during actual memory operation. It is not difficult to manufacture individual cells of acceptable quality using other materials and techniques, but the technique of manufacture disclosed herein is required to operate memory cells when the latter are used in large arrays formed on a single substrate. Deviations from the ranges set forth in the method of this application have resulted in cryogenic sheets whose cells are not uniform throughout the array. Close adherence to the method described herein has resulted in greatly improved thin film cryogenic sheet memories. Techniques for controlling the amount of oxygen or the pressure in the chamber 6 are not critical so long as the pressures are maintained below $1.5 \times 10^{-7}$ torr. Likewise other rate monitors than those suggested herein can be employed for maintaining a 40–80 A./sec. deposition rate and other means for monitoring conductance of the evaporated indium sheet film can be employed. A chapter entitled "Ultra-High Vacuum Evaporators and Residual Gas Analysis" by Hollis L. Caswell, appearing in the text "Physics of Thin Film," published in 1963 by the Academic Press of New York, N.Y., contains many instruments and procedures for obtaining and maintaining low pressures, monitoring the thickness of thin film depositions, controlling the temperature of substrates and evacuated chambers, or for measuring the conductance of thin film superconductive materials. In the practice of the present invention, criticality resides in the method of depositing indium to obtain a cryogenic memory plane rather than in the instrumentalities used.

While the invention has been particularly shown and described with reference to a preferred embodiment thereof, it will be understood by those skilled in the art that the various changes in form and details may be made therein without departing from the spirit and scope of the invention.

What is claimed is:

1. A method for manufacturing cryogenic memory sheets comprising the steps of vacuum depositing a film of indium onto an insulated substrate, maintaining said substrate at a temperature of 20° C. during said deposition, monitoring the deposition rate so as to maintain a deposition of 40–80 A./sec. of indium, measuring the sheet conductance of said film during deposition, and discontinuing said deposition when the sheet conductance of said deposited indium reaches a value of 0.5 to 1 mho/square.

2. A method for manufacturing cryogenic memory sheets comprising the steps of vacuum depositing a film of indium onto an insulated substrate, maintaining said substrate at a temperature of 20° C., the vacuum chamber at a pressure of less than $5 \times 10^{-6}$ torr, and the partial pressure of oxygen under $5 \times 10^{-8}$ torr during said deposition, monitoring the deposition rate so as to maintain a deposition of 40–80 A./sec. of indium, measuring the sheet conductance during the deposition of said film, and discontinuing said deposition when the sheet conductance of said deposited indium reaches a value of 0.5 to 1 mho/square.

3. A method for manufacturing cryogenic memory sheets comprising the steps of vacuum depositing a film of indium onto an insulated substrate, maintaining said substrate at a temperature of 20° C. during said deposition, monitoring the deposition rate so as to maintain a deposition of 40–80 A./sec. of indium, measuring the sheet conductance of said film during deposition, discontinuing said deposition when the sheet conductance of said deposited indium reaches a value of 0.5 to 1 mho/square, and depositing a polymer insulation over said indium layer.

References Cited

UNITED STATES PATENTS

| | | | |
|---|---|---|---|
| 2,879,364 | 4/1961 | Blaustein | 118—8 X |
| 3,023,727 | 3/1962 | Theodoseau et al. | 117—107.1 X |
| 3,055,775 | 9/1962 | Crittenden et al. | 117—107 X |
| 2,767,105 | 10/1956 | Fletcher | 117—107 X |
| 3,085,913 | 4/1963 | Caswell | 117—107 X |
| 3,119,707 | 1/1964 | Christy | 117—212 X |
| 3,239,375 | 3/1966 | Ames | 117—212 |
| 3,288,637 | 11/1966 | Ames | 117—107 X |

OTHER REFERENCES

Stout, M. B., Basic Electrical Measurements, 2d ed., Englewood Cliffs, N.J., Prentice-Hall, 1960, pp. 104 and 105.

Holland, L., Vacuum Deposition of Thin Films, New York, John Wiley and Sons, 1956, pp. 232,233, and 247–252.

P. Oberg and J. Lingensjo, Review of Scientific Instruments, 30, p. 1053 (1959).

A. J. Learn and R. S. Spriggs, Journal of Applied Physics, 34, No. 10, pp. 3012–3021 (1963).

G. M. Barrow, Physical Chemistry, McGraw-Hill Book Company, Inc., New York 1961, p. 515.

ALFRED L. LEAVITT, *Primary Examiner.*

C. K. WEIFFENBACH, *Assistant Examiner.*